(12) United States Patent
Ramic

(10) Patent No.: US 11,257,308 B2
(45) Date of Patent: Feb. 22, 2022

(54) ACTIONABLE EVENT DETERMINATION BASED ON VEHICLE DIAGNOSTIC DATA

(71) Applicant: Google LLC, Mountain View, CA (US)

(72) Inventor: Haris Ramic, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 229 days.

(21) Appl. No.: 16/463,007

(22) PCT Filed: Oct. 3, 2017

(86) PCT No.: PCT/US2017/054849
§ 371 (c)(1),
(2) Date: May 22, 2019

(87) PCT Pub. No.: WO2019/070233
PCT Pub. Date: Apr. 11, 2019

(65) Prior Publication Data
US 2019/0287323 A1 Sep. 19, 2019

(51) Int. Cl.
*G07C 5/08* (2006.01)
*G06F 3/16* (2006.01)

(52) U.S. Cl.
CPC .......... *G07C 5/0833* (2013.01); *G06F 3/165* (2013.01); *G06F 3/167* (2013.01); *G07C 5/0808* (2013.01)

(58) Field of Classification Search
CPC ..... G07C 5/0833; G07C 5/0808; G06F 3/165; G06F 3/167
See application file for complete search history.

(56) References Cited

U.S. PATENT DOCUMENTS

| 7,356,393 | B1 * | 4/2008 | Schlatre ................. | G06Q 10/06 701/29.3 |
| 2009/0174539 | A1 | 7/2009 | Benyola | |
| 2010/0152960 | A1 * | 6/2010 | Huber .................... | G06Q 10/06 701/31.4 |
| 2011/0167024 | A1 * | 7/2011 | Maldonado Diaz ... | G06N 3/086 706/10 |

(Continued)

FOREIGN PATENT DOCUMENTS

| GB | 2537612 | 10/2016 |
| JP | 6382843 | 4/1988 |

(Continued)

OTHER PUBLICATIONS

Korean Patent Office; Notice Office Action issued in Application No. 20160009156; 8 pages; dated Mar. 18, 2021.

(Continued)

*Primary Examiner* — Peter D Nolan
*Assistant Examiner* — Wae L Louie
(74) *Attorney, Agent, or Firm* — Middleton Reutlinger

(57) ABSTRACT

The present disclosure is generally related to systems and methods for determining an actionable event associated with a vehicle. The systems and methods can determine the event based on vehicle diagnostic data, and can report the event to a user via an appropriate interface. The systems and methods can also determine a recommended action to address the event, and can facilitate completion of the action upon approval by the user.

20 Claims, 4 Drawing Sheets

(56) References Cited

U.S. PATENT DOCUMENTS

| | | | |
|---|---|---|---|
| 2011/0301992 A1* | 12/2011 | Staaf | G07C 5/006 705/7.13 |
| 2012/0053778 A1* | 3/2012 | Colvin | G06Q 10/1097 701/29.4 |
| 2014/0180536 A1 | 6/2014 | Nagata | |
| 2014/0324275 A1* | 10/2014 | Stanek | G07C 5/008 701/31.4 |
| 2016/0071333 A1* | 3/2016 | Haidar | G07C 5/0808 701/29.3 |
| 2016/0112216 A1* | 4/2016 | Sargent | G07C 5/0808 370/328 |
| 2017/0053460 A1* | 2/2017 | Hauser | G07C 5/04 |
| 2019/0339688 A1* | 11/2019 | Celia | G05B 19/41865 |

FOREIGN PATENT DOCUMENTS

| | | |
|---|---|---|
| JP | 11500084 | 1/1999 |
| JP | 2012129704 | 7/2012 |
| KR | 20160009156 | 1/2016 |
| KR | 20160043302 | 4/2016 |
| WO | WO2017108143 | 6/2017 |

OTHER PUBLICATIONS

European Patent Office; Communication Pursuant to Article 94(3) EPC; 9 pages; dated Dec. 3, 2020.
Japanese Patent Office; Office Action issue in Application No. 2019-568320; 9 pages; dated Feb. 8, 2021.
International Search Report and Written Opinion of PCT Ser. No. PCT/US2017/054849 dated Jun. 14, 2018.
Korean Patent Office; Notice of Allowance issued in Application No. 2019-7036829; 3 pages; dated Jun. 29, 2021.
Intellectual Property India; Examination Report issued in Application No. 201927050874; 5 pages; dated Aug. 26, 2021.
Korean Patent Office; Notice Office Action issued in Application No. 2021-7024592; 9 pages; dated Aug. 30, 2021.
Japanese Patent Office; Notice of Allowance issued in Application No. 2019-568320; 3 pages; dated May 24, 2021.
Korean Patent Office: Notice of Allowance issued for Application No. 10-2021-7024592 dated Nov. 25, 2021. 3 pages.

* cited by examiner

ACTIONABLE EVENT DETERMINATION BASED ON VEHICLE DIAGNOSTIC DATA

BACKGROUND

Operating conditions of vehicles, such as cars, trucks, buses, and motorcycles, can deteriorate with time or use. Conditions surrounding vehicles can also change.

SUMMARY

According to an aspect of the disclosure, an audio based vehicle diagnostic system can be operational in a vehicular environment. The system can include a data processing system executing a digital assistant application installed in a vehicle and having an event determination component, a notification component, and a direct action application programming interface (API). The event determination component can receive, via an interface of the data processing system, vehicle diagnostic data sensed by at least one of a plurality of sensors associated with the vehicle. The event determination component can identify, based on an analysis of the vehicle diagnostic data, a trigger event associated with the vehicle. The digital assistant application can also include a notification component to select a first audio output interface based on the trigger event. The digital assistant application can also include a direct action application programming interface (API) to generate an event data message corresponding to the trigger event. The event data message can be compatible with the first audio output interface. The direct action API can also transmit the event data message from the digital assistant application to the first audio output interface to cause the first audio output interface to output information associated with the event data message as audio output.

According to an aspect of the disclosure, an audio based vehicle diagnostic method can include receiving, by an event determination component of a digital assistant application executed by a data processing system installed in a vehicle, via an interface of the data processing system, vehicle diagnostic data sensed by at least one of a plurality of sensors associated with the vehicle. The method can include identifying, by the event determination component, based on an analysis of the vehicle diagnostic data, a trigger event associated with the vehicle. The method can include selecting, by a notification component of the digital assistant application, a first audio output interface based on the trigger event. The method can include generating, a direct action API of the digital assistant application, an event data message corresponding to the trigger event. The event data message can be compatible with the first audio output interface. The method can include transmitting, by the direct action API, the event data message from the digital assistant application to the first audio output interface to cause the first audio output interface to output information associated with the event data message as audio output.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
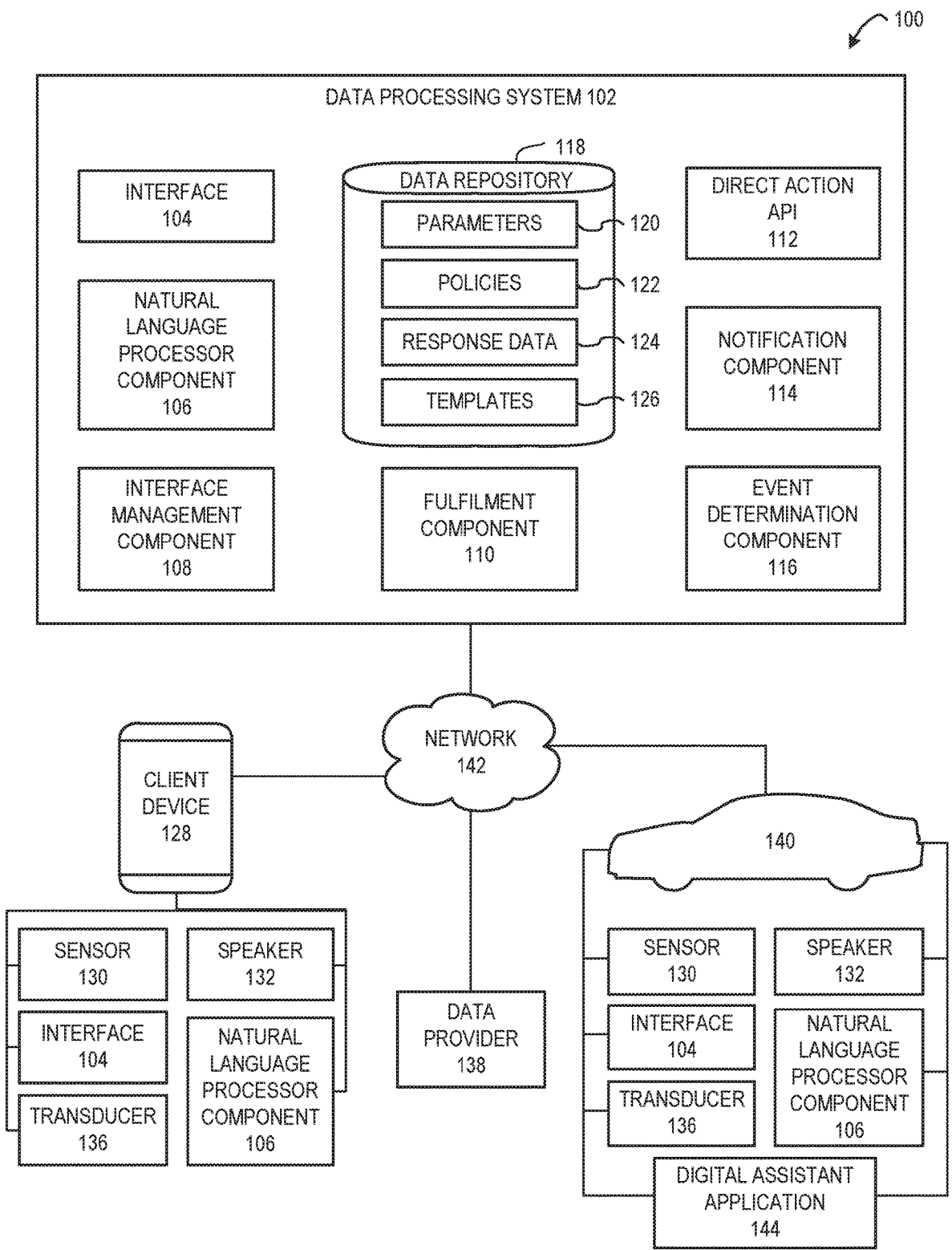
FIG. 1 illustrates an example system to determine an event associated with a vehicle.

Following below are more detailed descriptions of various concepts related to, and implementations of, methods, apparatuses, and systems for determining an event associated with a vehicle. The various concepts introduced above and discussed in greater detail below may be implemented in any of numerous ways. Vehicles, such as cars, trucks, buses, motorcycles, boats, planes, or other transport devices can include a plurality of sensors for collecting diagnostic data. The diagnostic data can be used to report failure conditions to a driver of such a vehicle. Vehicles may include limited output interfaces for reporting such information. As a result, when a failure condition is reported to a driver, for example by illuminating a "check engine" light on the vehicle's console, the driver may not readily be able to determine what caused the failure, or what action should be taken to correct the failure. In addition, diagnostic data may indicate a current failure condition, leaving the driver or other user with little or no time to take action to prevent the failure before it occurs.

The present disclosure is generally directed to a data processing system to determine actionable events associated with a vehicle based on vehicle diagnostic data. The data processing system can aggregate and process data from multiple sensors to determine and characterize vehicle events requiring the driver's attention, and can recommend corrective actions for such events and, upon approval, can facilitate the completion of the recommended corrective actions. The solutions of the present disclosure can improve computational efficiency by monitoring one or more states of the vehicle and reporting events associated with the vehicle only upon determining a change in one or more of the vehicle states. By performing at least some of the computations described below on a computing device within the vehicle, the system can reduce bandwidth utilization by dispensing with the need to transmit the diagnostic data to a remote computer over a computer network. Performing at least some of the computations on a computing device local to the vehicle also can improve latency, as network connections between the computing device local to the vehicle and other remote computing devices may be unreliable.

The systems and methods described herein can include a data processing system installed in a vehicle and including a digital assistant application. The digital assistant application can be a software application that facilitates a two-way conversation between the digital assistant application and a human user. The conversation can be carried out using natural language, e.g., in English or other language. The digital assistant application can receive vehicle diagnostic data from any number of sensors associated with the vehicle, and can process the diagnostic data to determine a trigger event that should be reported to a user (e.g., a driver or an owner of the vehicle). The digital assistant application can select an appropriate interface for reporting the trigger event, and can generate an event data message corresponding to the trigger event and formatted in accordance with the selected interface. For example, the selected interface can be a speaker in the interior cabin of the vehicle, and the digital assistant application can format the event data message as audio to be played through the speaker. The digital assistant application can then transmit the event data message to be output via the selected interface. The digital assistant application can also determine a recommended action to address the trigger event, and can notify the user of the recommended action. Upon receiving approval from the user, the digital assistant application can facilitate completion of the action. For example, the recommended action may be a maintenance activity to be performed by a mechanic, and the digital assistant application can assist the user with scheduling an appointment with a local mechanic. By performing at least a portion of the computational analysis necessary for identifying trigger events and recommended actions locally within the vehicle, the digital assistant application can save network bandwidth, reduce processor utilization, and save electrical power, relative to alternatives requiring such calculations to be carried out by a computing device remote from the vehicle.

FIG. 1 illustrates an example system 100 to determine an event associated with a vehicle. The system 100 can include at least one data processing system 102, one or more client devices 128, and one or more vehicles 140.

The data processing system 102 can include an interface 104. The data processing system 102 can include a natural language processor (NLP) component 106 to parse audio-based inputs. The data processing system 102 can include an interface management component 108 to detect and manage the interfaces of other devices in the system 100. The data processing system 102 can include an event determination component 116 to determine events associated with the vehicle 140, as well as recommended actions to be taken in response to the determined events. The data processing system 102 can include a notification component 114 to select interfaces through which a user can be notified about an event or a recommended action. The data processing system 102 can include a fulfilment component 110 to facilitate completion of a recommended action, upon receiving approval from the user. The data processing system 102 can include a direct action application programming interface (API) 112. The data processing system 102 can include a data repository 118 in which the data processing system 102 can store parameters 120, policies 122, response data 124, and templates 126. The client device 128 and the vehicle 140 can include and execute instances of any of the components of the data processing system 102. The client device 128 and the vehicle 140 can each include all or part of the data processing system 102.

The system 100 can also include one or more client devices 128. The client devices 128 can include sensors 130, speakers 132, interfaces 104, and transducers 136. The client devices 128 can execute an instance of the NLP component 106. The system 100 can also include one or more data providers 138. The system 100 can include one or more vehicles 140. The vehicles 140 can include sensors 130, speakers 132, interfaces 104, and transducers 136. The vehicles 140 can execute an instance of the NLP component 106. The vehicles 140 can also include a digital assistant application 144. The digital assistant application 144 can include one, more than one, or all of the components shown in the data processing system 102. The operations described herein in connection with the data processing system 102 can be performed locally within the vehicle 140.

The components of the system 100 can communicate over a network 142. In some implementations, one or more of the client devices 128 can be located within an instance of the vehicle 140. For example, the client device 128 can be the mobile phone in the pocket of a driver driving the vehicle 140. One or more of the client devices 128 can also be remote to the vehicles 140. For example, after the driver parks and exits the vehicle 140 carrying the mobile phone, the driver's mobile phone may be remote to the vehicle 140.

The network 142 can include computer networks such as the internet, local, wide, metro, or other area networks, intranets, satellite networks, other computer networks such as voice or data mobile phone communication networks, and combinations thereof. The network 142 can be used by the data processing system 102, client devices 128, and vehicles 140 to access information resources such as web pages, web sites, domain names, uniform resource locators, or data providers 138. For example, the data processing system 102 can, via the network 142, access a data provider 138 that provides weather data for specific locations, such as a location associated with a vehicle 140.

The network 142 can include, for example, a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network or a wireline network, and combinations thereof. The network 142 can include a wireless link, such as an infrared channel or satellite band. The topology of the network 142 may include a bus, star, or ring network topology. The network 142 can include mobile telephone networks using any protocol or protocols used to communicate among mobile devices, including advanced mobile phone protocol (AMPS), time division multiple access (TDMA), code-division multiple access (CDMA), global system for mobile communication (GSM), general packet radio services (GPRS), or universal mobile telecommunications system (UMTS). Different types of data may be transmitted via different protocols, or the same types of data may be transmitted via different protocols.

The client devices 128 and the vehicles 140 can each include at least one logic device such as a computing device having a processor to communicate with each other with the data processing system 102 via the network 142. The client devices 128 and the vehicles 140 can include an instance of the any of the components described in relation to the data processing system 102. The client devices 128 and the vehicles 140 can include an instance of the data processing system 102. The client devices 128 can include a desktop computer, laptop computer, tablet computer, personal digital assistant, smartphone, mobile device, portable computer, thin client computer, virtual server, speaker-based digital assistant, or any other type or form of computing device. The vehicle 140 can include manual or autonomous cars, trucks, buses, industrial vehicles, motorcycles, boats, aircraft, or other transportation machines. The vehicle 140 can include one or more processors that can execute an instance of the data processing system 102 or any component thereof. For example, the data processing system 102 or its components can be executed by the digital assistant application 144. The processors used to execute the data processing system 102 can be components of a computing device of the vehicle 140, such as a head unit of the vehicle 140.

The client device 128 and the vehicle 140 can include at least one sensor 130, at least one transducer 136, at least one audio driver, and at least one speaker 132. The sensor 130 can include a microphone or audio input sensor. The sensor 130 can also include at least one of a GPS sensor, proximity sensor, ambient light sensor, temperature sensor, motion sensor, accelerometer, or gyroscope. The sensor 130 can include an occupancy or weight sensor. The sensor 130 also can include a sensor associated with an instrument of the vehicle 140, such as a speedometer, an odometer, a gas gauge, or any other sensor associated with the functionality of the vehicle 140. The transducer 136 can convert audio input into an electronic signal. The audio driver can include a script or program executed by one or more processors of the client device 128 or the vehicle 140 to control the speaker 132. The speaker 132 can render audio signals by converting electrical signals into audible waves.

The client device 128 and the vehicle 140 can be associated with an end user that may enter voice queries or commands as input audio signals into the client device 128 or the vehicle 140 (e.g., via the sensor 130, the interface 104, or the digital assistant application 144) and receives audio output in the form of a computer-generated voice that can be provided from the data processing system 102 (e.g., via the speaker 132). The vehicle 140 or any of its components can also generate event data messages corresponding to trigger events or action data messages to perform predetermined functions or actions to address the trigger events. The interface 104 can receive or provide data messages to the direct action API 112 of the data processing system 102 and enable communication between the components of the system 100. The client device 128 and the vehicle 140 can also include a user interface that enables a user to interact with the components of the system 100.

The data processing system 102 can include at least one server having at least one processor. For example, the data processing system 102 can include a plurality of servers located in at least one data center or server farm. The data processing system 102 can determine from an audio input signal a request and a trigger keyword associated with a request or a command. Based on the request or command and the trigger keyword, the data processing system 102 can generate or select response data. The response data can be audio-based or text-based. For example, the response data can include one or more audio files that when rendered provide an audio output or acoustic wave via the speaker 132. The data within the response data can also be referred to as content items. The response data can include other content (e.g., text, video, or image content) in addition to audio content.

The data processing system 102 can include multiple, logically grouped servers and facilitate distributed computing techniques. The logical group of servers may be referred to as a data center, server farm or a machine farm. The servers can be geographically dispersed. A data center or machine farm may be administered as a single entity, or the machine farm can include a plurality of machine farms. The servers within each machine farm can be heterogeneous— one or more of the servers or machines can operate according to one or more type of operating system platform. The data processing system 102 can include servers in a data center that are stored in one or more high-density rack systems, along with associated storage systems, located for example in an enterprise data center. The data processing system 102 with consolidated servers in this way can improve system manageability, data security, the physical security of the system, and system performance by locating servers and high performance storage systems on localized high performance networks. In some implementations, centralizing of all or some of the data processing system 102 components, including servers and storage systems, and coupling them with advanced system management tools can allow for more efficient use of server resources, which can save power and processing requirements and can reduce bandwidth usage. Each of the components of the data processing system 102 can include at least one processing unit, server, virtual server, circuit, engine, agent, appliance, or other logic device such as programmable logic arrays configured to communicate with the data repository 118 and with other computing devices, as well as scripts, programs, or applications.

The data processing system 102 can include the data repository 118. The data repository 118 can include one or more local or distributed databases and can include a database management system. The data repository 118 can include computer data storage or memory and can store one or more parameters 120, one or more policies 122, response data 124, and templates 126, among other data. The parameters 120, policies 122, and templates 126 can include information such as rules about a voice-based session between the client device 128, data processing system 102, and vehicle 140. The parameters 120, policies 122, and templates 126 can also include information such rules for processing, analyzing, or prioritizing diagnostic data from the sensors 130 to identify trigger events or recommended actions. The response data 124 can include content items for audio output or associated metadata relating to the identified trigger events or recommended actions, as well as input audio messages that can be part of one or more communication sessions with the client device 128.

An application, script, program, or other components associated with the data processing system 102 can be installed at the client device 128 or the vehicle 140. In some implementations, the application can be or can include the digital assistant application 144. The application can enable the client device 128 or vehicle 140 to communicate input audio signals (and other data) to the interface 104 of the data processing system 102. The application can enable the client device 128 and the vehicle 140 to drive components of the client device 128 and the vehicle 140 to render the output audio signals.

The direct action API 112 of the data processing system 102 can generate an event data message. The event data message can include data, instructions, or other information corresponding to a trigger event of the vehicle 140. The direct action API 112 can generate the event data message based on an analysis of vehicle diagnostic data received, for example, from the sensors 130. The direct action API 112 can generate the event data message based on information received from other components of the system 100, such as the data provider 138 or the client device 128. The event data message can be a JSON formatted data message, an XML formatted data message, and audio data message, an email data message, a text message, or a push notification for a mobile computing device, for example.

The event determination component 116 can process sensor information and other information to determine a trigger event. The trigger event can correspond to a failure of a component of the vehicle 140, and the event determination component 116 can determine that the failure has occurred based on data received from the sensor 130. For example, the sensor 130 can correspond to a temperature sensor under the hood of the vehicle 140, and event determination component 116 can determine that the temperature readout from the sensor 130 indicates that the engine temperature is too high. Based on this analysis, the event determination component 116 can identify a trigger event corresponding to the engine temperature. The direct action API 112 can generate an event data message including information related to the trigger event, such as the part of the vehicle impacted (i.e., the engine), the reason for the trigger event (i.e., a temperature outside an acceptable range), and other parameters that may be associated with the trigger event (i.e., the specific temperature measured by the sensor 130 that caused the event determination component 116 to determine the trigger event).

The event determination component 116 can generate a trigger event that may not necessarily correspond to a failure of a component of the vehicle 140, but still may warrant a user's attention. For example, the sensor 130 can include a sensor for determining a position of at least one window of the vehicle 140. The event determination component 116 can determine that the output from the sensor 130 indicates the at least one window is open. The event determination component 116 can also receive weather information from the data provider 138 for a location near the vehicle 140. In this example, the event determination component 116 can determine a trigger event based on the determination that it is raining or likely to rain, and that a window of the vehicle 140 is open. The direct action API 112 can then generate the event data message including information indicating that the window is open and that it is raining or likely to rain in a location near the vehicle 140.

The direct action API 112 also can transmit the event data message to at least one output interface in a manner that is compatible with the at least one output interface. For example, the direct action API 112 can transmit the event data message to the speaker 132 inside the vehicle 140 as an audio file, to cause the speaker 132 to play audio informing the user of the trigger event. The notification component 114 can determine the interface through which the event data message is transmitted. For example, if the vehicle 140 is in use by a driver, the notification component 114 can determine that an interface within the vehicle 140 (e.g., the speaker 132 of the vehicle 140) should be selected so that the driver can be notified of the trigger event immediately. On the other hand, if the vehicle 140 is parked, the notification component 114 can determine that a different interface, such as the speaker 132 of the client device 128, should be selected, so that the user has a better chance of successfully being notified of the trigger event while the user is away from the vehicle. The notification component 114 can determine multiple interfaces to be used for a single trigger event. The direct action API 112 can then generate an event data message corresponding to each of the selected interfaces, and can transmit the event data messages to their respective selected interfaces.

The event determination component 116 also can determine a recommended action for a trigger event. A recommended action can be any action that may suitable for addressing the trigger event. Continuing the example described above in which the trigger event corresponds to a window of the vehicle 140 being open at a time when information from the data provider 138 indicates that it is likely to be raining, the event determination component 116 can determine that the recommended action is to close the window that is open to prevent damage to the interior of the vehicle that could be caused by the rain. In this example, the direct action API 112 can generate an action data message corresponding to the recommended action. The action data message can include any information relating to the recommended action, such as an identification of the action and a time at which the action should be performed. Like the event data message, the action data message also can be formatted in a variety of ways, such as a JSON formatted message or an XML formatted message, and audio message, a video message, an email message, a text message, or a push notification for a mobile computing device, for example. The event determination component 116 can determine an appropriate interface through which the user should be notified of the recommended action, the direct action API 112 can generate the action data message in a manner compatible with the selected interface, and the direct action API 112 can transmit the action data message to the selected interface.

As described above, an event data message or an action data message can be a data message that includes attributes relating to the respective trigger event or recommended action. The attributes can include a location of the vehicle 140, a location of the client device 128, an authorization level of a user associated with a client device 128, a vehicle identifier, an interface identifier, a vehicular state, or a request state, for example. The direct action API 112 can retrieve a template 126 from the repository 118 to determine which fields or attributes to include in an event data message or an action data message. The direct action API 112 can determine necessary parameters and can package the information into an action data message. The direct action API 112 can retrieve content from the repository 118 to obtain information for the attributes of the data message.

The NLP component 106 can receive input audio signals. The data processing system 102 can receive the input audio signal, for example, from the client device 128 or from the vehicle 140. A first device can execute the NLP component 106 and the NLP component 106 can receive the input audio signal from a second device. For example, the vehicle 140 can execute the NLP component 106 and the input audio signal can be received from the client device 128.

The NLP component 106 can convert input audio signals into recognized text by comparing the input audio signal against a stored, representative set of audio waveforms and choosing the closest matches. The representative waveforms can be generated across a large set of input audio signals. After the input audio signal is converted into recognized text, the NLP component 106 can match the text to words that are associated, for example, via a learning phase, with actions or output audio signals.

From the input audio signal, the NLP component 106 can identify at least one request or command, or at least one trigger or hot keyword corresponding to the request or command. The request or command can indicate intent or subject matter of the input audio signal. The trigger keyword can indicate a type of action likely to be taken. For example, the NLP component 106 can parse the input audio signal to identify a request to lock the doors of the vehicle 140 in response to a recommended action of locking the doors. The trigger keyword can include at least one word, phrase, root or partial word, or derivative indicating an action to be taken. For example, the trigger keywords can be "go," "ok," "hey," "yes," or "no."

The NLP component 106 can allow a user to respond after the action data message is transmitted to the selected interface. For example, the action data message can include an indicated action as well as a request for authorization to perform the action. The user can provide authorization to perform the indicated action in natural language to be processed by the NLP component 106, for example by using one of the trigger keywords such as "yes" or "no." To continue again with the example above in which the trigger event corresponds to an open window of the vehicle 140 during a time when rain is likely in the vicinity of the vehicle 140 and the recommended action is to close the window, the action data message may include a request for authorization to perform the recommended action. The user can authorize the recommended action to be performed by saying "yes," and can deny authorization for the recommended action by saying "no."

When, for example, the user authorizes the recommended action, the fulfilment component 110 can facilitate completion of the action. For example, the fulfilment component 110 can communicate with various features and components of the car to take a variety of actions, upon receiving authorization from the user. Continuing again with the above example, the fulfilment component 110 can cause one or more open windows of the vehicle 140 to close upon receiving authorization from the user to close the open windows. The fulfilment component 110 can perform actions that are not associated with components of the vehicle. For example, for a trigger event corresponding to a more serious failure condition requiring maintenance by a trained professional, such as an engine failure, the recommended action may be to bring the vehicle 140 to a mechanic. If the user authorizes the action, the fulfilment component 110 can automatically schedule an appointment with a local mechanic. The fulfilment component 110 can use information provided by one or more client devices 128 to schedule the appointment. For example, a first client device 128 can belong to an owner of the vehicle 140, while a second client device 128 can belong to a mechanic. Based on calendar information from one or both of these client devices 128, the fulfilment component 110 can select a convenient time for scheduling the appointment.

Figure 2:
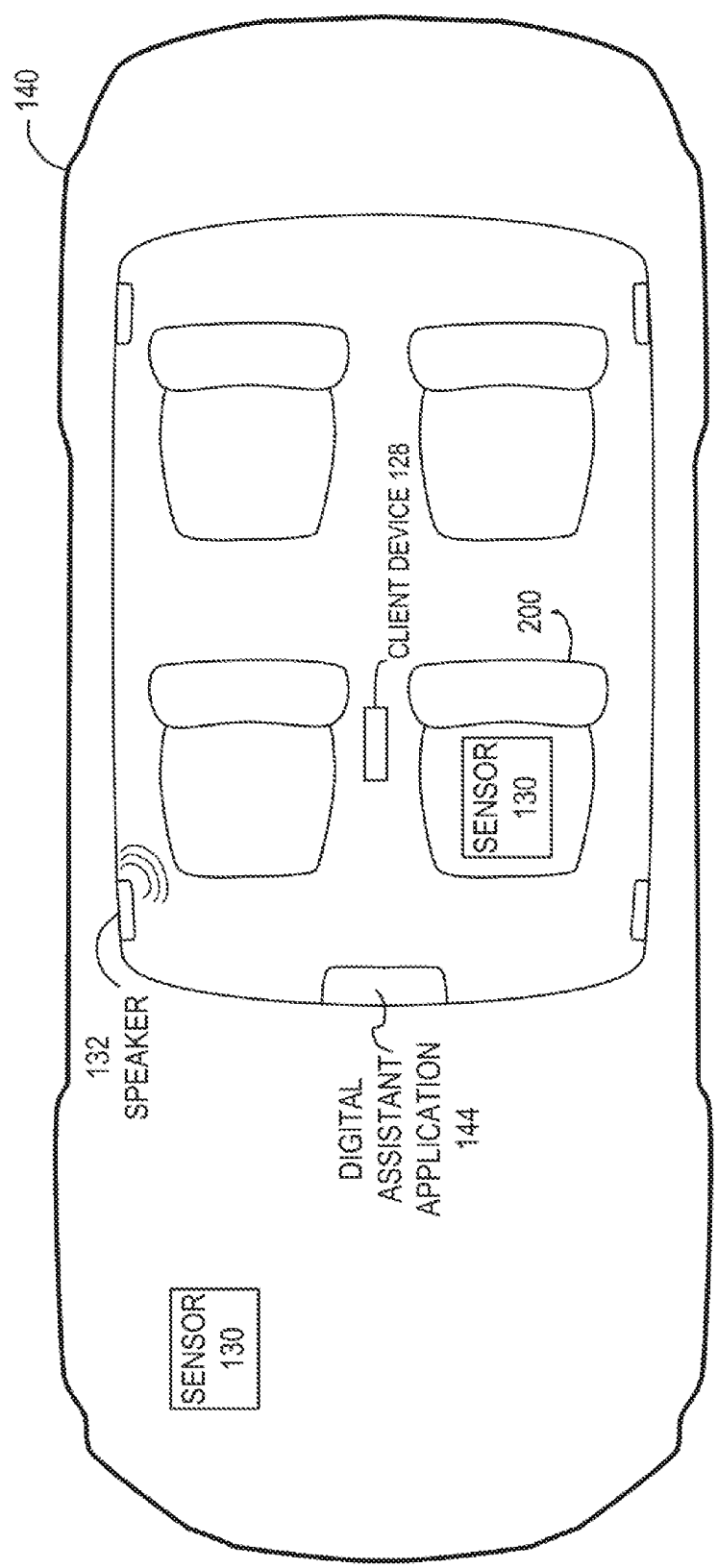
FIG. 2 illustrates a top view of a vehicle included in the system of FIG. 1, including an interior cabin of the vehicle.

FIG. 2 illustrates a top view of the vehicle 140 included in the system 100 of FIG. 1, including an interior cabin of the vehicle 140. The interior cabin of the vehicle 140 can include a plurality of seats 200. Each of the seats 200 can include one or more sensors 130. In some implementations, the sensors 130 in the seats 200 can be weight or occupancy sensors. The interior cabin of the vehicle 140 can include a plurality of speakers 132. The vehicle 140 also includes the digital assistant application 144, which can execute one or more of the components described in relation to the data processing system 102 or the vehicle 140, as discussed above in connection with FIG. 1. For example, the digital assistant application 144 can include all of components of the data processing system 102 within the vehicle 140.

The digital assistant application 144 can determine the relative position (or presence or absence) of a client device 128 within the vehicle 140. The position or presence of the client device 128 can be incorporated into one or more attributes of a state of the vehicle 140, which may be relevant for generating the event data messages or action data messages, and for selecting interfaces through which these data messages are transmitted. For example, a trigger event may occur during a time when the digital assistant application 144 determines that the client device 128 is not in the vehicle 140. Because a data message transmitted through the speaker 132 of the vehicle would not successfully notify the user of the trigger event when the user is away from the vehicle, the notification component 114 may select a different interface to communicate the event data message for that trigger event. The position or location of the client devices 128 be a relative position and can include different levels of resolution. The digital assistant application 144 can determine similar information using the occupancy sensors 130 determine whether the user is located within the vehicle 140 at a particular time.

The vehicle 140 also includes a sensor 130 located in the engine compartment. The number and positioning of the sensors 130 shown in FIG. 2 is illustrative only, and is not intended to be limiting. In practice, the vehicle 140 may include any number of sensors 130 located throughout the vehicle 140 and measuring any type of diagnostic data that may be relevant to the determination of a trigger event.

The digital assistant application 144 can analyze the combined output from two or more sensors to determine a vehicle state or a trigger event. Combining the outputs of multiple sensors can allow for more accurate or more detailed determination of trigger events. For example, a first sensor 130 may be a GPS receiver, while a second sensor 130 may be a speedometer. The digital assistant application 144 can analyze the output of both sensors to accurately determine a state of the vehicle 140. For example, GPS data may indicate that the vehicle is moving, while speedometer data indicates that the vehicle is stopped. The digital assistant application 144 can be configured to analyze both types of data to resolve the apparent inconsistency. For example, the digital assistant application 144 may determine from this data that the vehicle 140 is being towed on a flatbed truck.

In some implementations, the digital assistant application 144 can use data received from the sensors 130 to make predictions about trigger events that have not occurred yet, but are likely to occur in the future. For example, the digital assistant application 144 can process speedometer data to determine how quickly the vehicle typically accelerates and decelerates. Because deceleration rate may impact the functional lifetime of tires and brake pads, the digital assistant application 144 can determine when such components are likely to fail, even before such a failure occurs. The digital assistant application 144 can generate a trigger event corresponding to an imminent failure before the failure occurs. The recommended action associated with such an event may be a preventive maintenance action, thereby allowing the user an opportunity to prevent certain types of failures before they occur.

Figure 3:
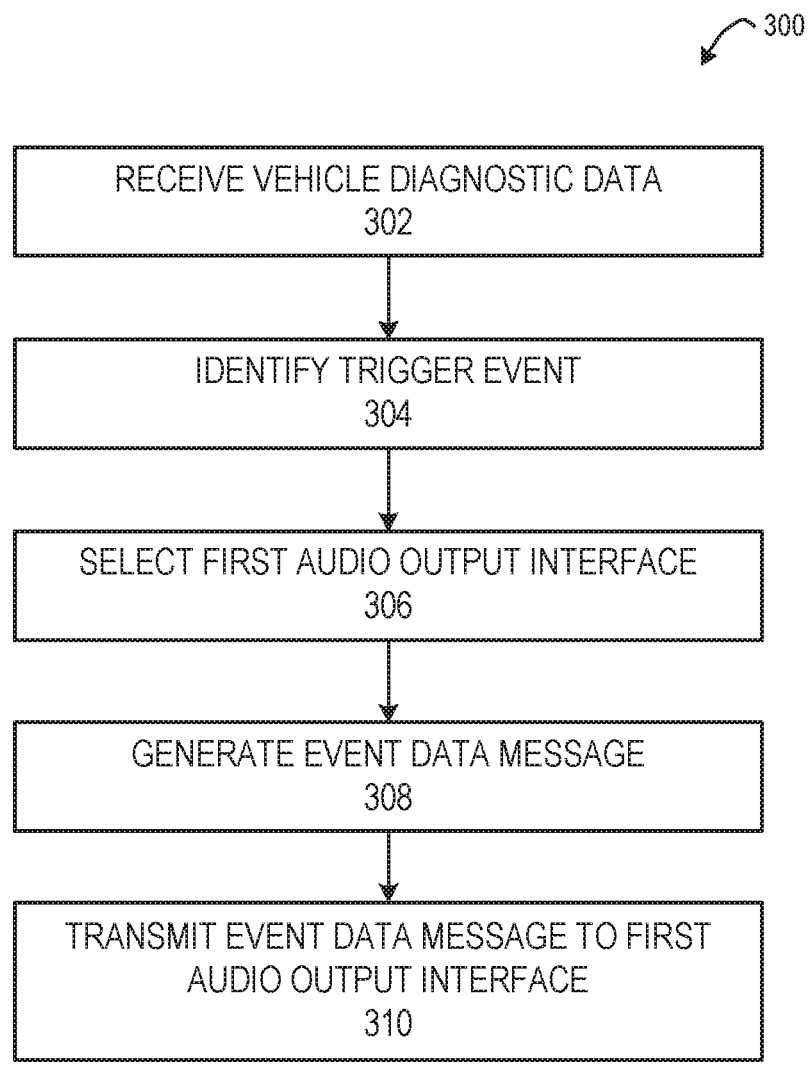
FIG. 3 illustrates an example audio based vehicle diagnostic method using the example system illustrated in FIG. 1.

FIG. 3 illustrates an example audio based vehicle diagnostic method 300 using the system 100 of FIG. 1. The method 300 is described below with reference to some of the components shown in FIG. 1. The method 300 can include receiving diagnostic data (BLOCK 302). The method 300 can include identifying a trigger event (BLOCK 304). The method 300 can include selecting a first audio output interface (BLOCK 306). The method 300 can include generating an event data message (BLOCK 308). The method 300 can include transmitting the event data message to the first audio output interface (BLOCK 310).

The method 300 can include receiving diagnostic data (BLOCK 302). In some implementations, the diagnostic data can be received by the event determination component 116 shown in FIG. 1. The diagnostic data can be received via an interface of the data processing system 102 shown in FIG. 1, such as the interface 104. Diagnostic data can be data sensed or determined by any number of sensors 130, which may be installed in the vehicle 140, or may be included within computing devices remote from the vehicle 140. For example, diagnostic data may be received from a sensor 130 of a client device 128, which may be owned or accessed by a driver of the vehicle 140, even when the client device 128 is not present within the vehicle 140. The event determination component 116 can also receive diagnostic data from external sources such as the data provider 138. Diagnostic data can include any data useful or suitable for determining a current state of the vehicle 140 or an actionable event associated with the vehicle 140. Thus, diagnostic data can include data relating to functional components of the vehicle 140 (e.g., engine components, wheels, tires, electronics, instruments, etc.), as well as data relating to environmental conditions in and around the vehicle 140.

The method 300 can include identifying a trigger event (BLOCK 304). A trigger event can include any event that an owner or operator of the vehicle 140 may wish to be informed of or to act on. The trigger event can be identified by the event determination component event determination component 116 based on an analysis of the diagnostic data. The trigger event can correspond to a failure of a component of the vehicle 140. For example, the sensor 130 can correspond to an air pressure sensor of a tire of the vehicle 140, and event determination component 116 can determine that the pressure readout from the sensor 130 indicates that the tire is flat or underinflated. Based on this analysis, the event determination component 116 can identify a trigger event corresponding to the low tire pressure.

The event determination component 116 can generate a trigger event that may not correspond to a failure of a component of the vehicle 140. For example, the sensor 130 can include a sensor for determining whether the doors of the vehicle 140 are locked. The event determination component 116 can determine that the output from the sensor 130 indicates the at least one door is unlocked. If the event determination component 116 also determines that the vehicle is unoccupied (e.g., based on data from an occupancy or weight sensor 130), the event determination component 116 can determine a trigger event based on the unlocked status of the door.

The event determination component 116 can also determine a priority level associated with the trigger event. For example, the event determination component 116 can determine that a trigger event relating to a major failure of the vehicle 140 (such as an engine or transmission failure) may have a relatively high priority level. The event determination component 116 can also determine that a trigger event corresponding to preventive maintenance may have a relatively lower priority level.

The method 300 can include selecting a first audio output interface (BLOCK 306). The first audio output interface can be selected by the notification component 114. The notification component 114 can select an audio output interface built into the vehicle 140, such as the speaker 132. For example, if occupancy sensor data indicates that the user is inside the vehicle, the notification component 114 can determine that the speaker 132 is an appropriate interface through which to communicate information to the user. Selecting an audio output interface can facilitate operation when the vehicle is in use, as the driver does not have to avert his or her eyes from the road in order to receive information from an audio output interface. In instances in which the user is not located within the vehicle, the notification component 114 can select a different audio output interface. For example, the notification component 114 can select the speaker 132 of the client device 128 as the first audio output interface if the user is not inside the vehicle 140.

The notification component 114 can also determine a notification time for the event data message. Generally, the notification time can be the time at which the user should be notified about the trigger event. For example, for a non-urgent trigger event, the notification component 114 may select the notification time as a time during which the user's calendar indicates that the user is not busy. Thus, the notification time may be delayed from a current time, so as not to interrupt the user with information relating to a non-urgent trigger event. However, if the trigger event is urgent or is otherwise indicated as being high priority, the notification component 114 may select an earlier time for the notification time.

The method 300 can include generating an event data message (BLOCK 308). The direct action API 112 can generate the event data message. The event data message can correspond to the identified trigger event. The event data message can be formatted as audio output compatible with the first audio output interface. For example, in some implementations, the event data message can be an audio file, such as a .wav or .mp3 file. Generally, the event data message can include any information related to trigger event, such as an indication of the trigger event, a time at which the trigger event occurred, an identification of the vehicle 140, and any parameters associated with the trigger event, such as readouts from sensors 130 whose values are outside of acceptable ranges.

The method 300 can include transmitting the event data message to the first audio output interface (BLOCK 310). The direct action API 112 can transmit the event data message from the data processing system 102 to the first audio output interface. The direct action API 112 can delay transmission of the event data message until the notification time selected by the notification component 114. Transmission of the event data message to the first audio output interface can cause the first audio output interface to output information associated with the event data message as audio output. The notification component 114 can also select additional interfaces (some of which may be non-audio interfaces) through which information about the trigger event should be communicated. The direct action API 112 can generate a respective event data message for each selected interface, and can transmit the event data messages to their respective interfaces. Thus, the user may be informed about the trigger event via more than one interface, to increase the probability that the user successfully receives the information about the trigger event.

Figure 4:
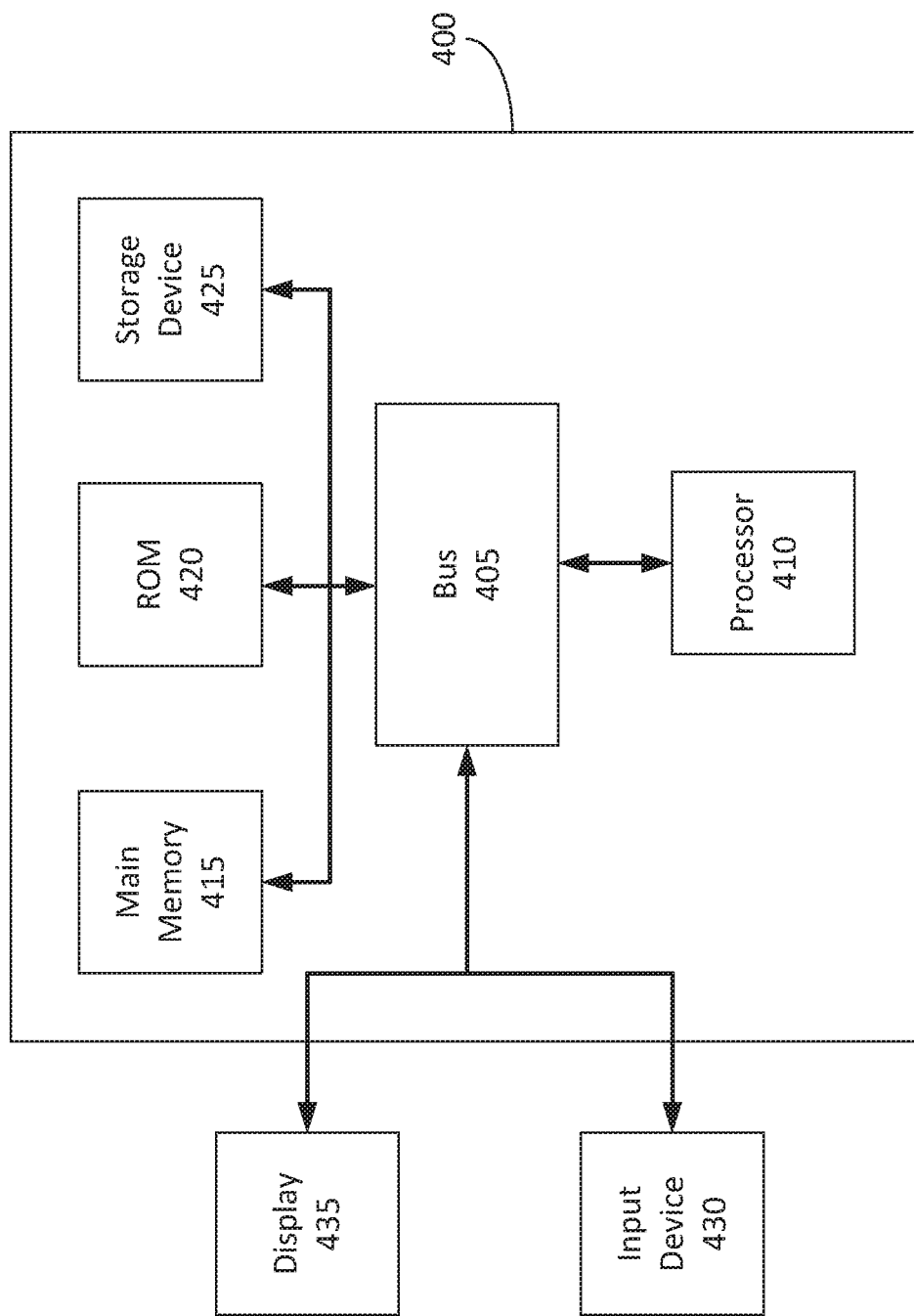
FIG. 4 is a block diagram of an example computer system.

FIG. 4 is a block diagram of an example computer system 400. The computer system or computing device 400 can include or be used to implement the system 100 or its components such as the data processing system 102. The computing system 400 includes a bus 405 or other communication component for communicating information and a processor 410 or processing circuit coupled to the bus 405 for processing information. The computing system 400 can also include one or more processors 410 or processing circuits coupled to the bus for processing information. The computing system 400 also includes main memory 415, such as a random access memory (RAM) or other dynamic storage device, coupled to the bus 405 for storing information, and instructions to be executed by the processor 410. The main memory 415 can be or include the data repository 118. The main memory 415 can also be used for storing position information, temporary variables, or other intermediate information during execution of instructions by the processor 410. The computing system 400 may further include a read-only memory (ROM) 420 or other static storage device coupled to the bus 405 for storing static information and instructions for the processor 410. A storage device 425, such as a solid state device, magnetic disk or optical disk, can be coupled to the bus 405 to persistently store information and instructions. The storage device 425 can include or be part of the data repository 118.

The computing system 400 may be coupled via the bus 405 to a display 435, such as a liquid crystal display or active matrix display, for displaying information to a user. An input device 430, such as a keyboard including alphanumeric and other keys, may be coupled to the bus 405 for communicating information and command selections to the processor 410. The input device 430 can include a touch screen display 435. The input device 430 can also include a cursor control, such as a mouse, a trackball, or cursor direction keys, for communicating direction information and command selections to the processor 410 and for controlling cursor movement on the display 435. The display 435 can be part of the data processing system 102, the client computing device 128, or other components of FIG. 1, for example.

The processes, systems and methods described herein can be implemented by the computing system 400 in response to the processor 410 executing an arrangement of instructions contained in main memory 415. Such instructions can be read into main memory 415 from another computer-readable medium, such as the storage device 425. Execution of the arrangement of instructions contained in main memory 415 causes the computing system 400 to perform the illustrative processes described herein. One or more processors in a multi-processing arrangement may also be employed to execute the instructions contained in main memory 415. Hard-wired circuitry can be used in place of or in combination with software instructions together with the systems and methods described herein. Systems and methods described herein are not limited to any specific combination of hardware circuitry and software.

Although an example computing system has been described in FIG. 4, the subject matter including the operations described in this specification can be implemented in other types of digital electronic circuitry, or in computer software, firmware, or hardware, including the structures disclosed in this specification and their structural equivalents, or in combinations of one or more of them.

For situations in which the systems discussed herein collect personal information about users, or may make use of personal information, the users may be provided with an opportunity to control whether programs or features that may collect personal information (e.g., information about a user's social network, social actions, or activities; a user's preferences; or a user's location), or to control whether or how to receive content from a content server or other data processing system that may be more relevant to the user. In addition, certain data may be anonymized in one or more ways before it is stored or used, so that personally identifiable information is removed when generating parameters. For example, a user's identity may be anonymized so that no personally identifiable information can be determined for the user, or a user's geographic location may be generalized where location information is obtained (such as to a city, postal code, or state level), so that a particular location of a user cannot be determined. Thus, the user may have control over how information is collected about him or her and used by the content server.

The subject matter and the operations described in this specification can be implemented in digital electronic circuitry or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial-access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "data processing system," "computing device," "component," or "data processing apparatus" encompass various apparatuses, devices, and machines for processing data, including by way of example a programmable processor, a computer, a system on a chip, or multiple ones, or combinations of the foregoing. The apparatus can include special-purpose logic circuitry, e.g., an FPGA (field-programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The components of system 100 can include or share one or more data processing apparatuses, systems, computing devices, or processors.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system 102) to perform actions by operating on input data and generating output. The processes and logic flows can also be performed by, and apparatuses can also be implemented as, special purpose logic circuitry, e.g., an FPGA (field-programmable gate array) or an ASIC (application-specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing systems such as system 100 or system 400 can include clients and servers. A client and server are generally remote from each other and typically interact through a communication network (e.g., the network 142). The relationship of client and server arises by virtue of computer programs running on the respective computers and having a client-server relationship to each other. In some implementations, a server transmits data (e.g., data packets representing a content item) to a client device (e.g., for purposes of displaying data to and receiving user input from a user interacting with the client device). Data generated at the client device (e.g., a result of the user interaction) can be received from the client device at the server (e.g., received by the data processing system 102 from the client computing device 128 or the vehicle 140).

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product. For example, the NLP component 106 and the event determination component 116 can be a single component, app, or program, or a logic device having one or more processing circuits, or part of one or more servers of the data processing system 102.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements, and features discussed in connection with one implementation are not intended to be excluded from a similar role in other implementations or implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation," or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to "at least one of 'A' and 'B'" can include only 'A', only 'B', as well as both 'A' and 'B'. Such references used in conjunction with "comprising" or other open terminology can include additional items.

Where technical features in the drawings, detailed description, or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed:

1. A vehicle diagnostic system operational in a vehicular environment, the vehicle diagnostic system comprising:
   a data processing system that executes a digital assistant application installed in a vehicle and having an event determination component, a notification component, and a direct action application programming interface, the data processing system is configured to:
   receive, by the event determination component and via an interface of the data processing system, vehicle diagnostic data sensed by at least one of a plurality of sensors of the vehicle; and
   identify, by the event determination component, based on an analysis of the vehicle diagnostic data, a trigger event associated with the vehicle, wherein the event determination component analyzes the vehicle diagnostic data to predict a future maintenance activity of the vehicle, and
wherein the trigger event associated with the vehicle corresponds to the future maintenance activity;
the notification component is configured to:
select an output interface of the vehicle based on the trigger event; and
the direct action application programming interface is configured to:
generate an event data message corresponding to the trigger event, the event data message formatted as output compatible with the output interface; and
transmit the event data message from the digital assistant application to the output interface to cause the output interface to output information associated with the event data message as an interface output.

2. The system of claim 1, wherein the event determination component determines a recommended action associated with the trigger event, and wherein the direct action application programming interface generates the event data message to include information corresponding to the recommended action.

3. The system of claim 2, wherein the event determination component determines the recommended action based in part on information stored on a computing device remote from the vehicle.

4. The system of claim 1 further comprising:
the digital assistant application including a natural language processor component configured to:
receive, via an interface of the data processing system, an input audio signal, and
parse the input audio signal to identify a request, wherein the direct action application programming interface generates an action data message based on the request, the action data message indicating a function.

5. The system of claim 1 further comprising:
the digital assistant application including a fulfilment component, wherein the direct action application programming interface transmits an action data message to the fulfilment component, and wherein the fulfilment component executes a function indicated by the action data message.

6. The system of claim 1, wherein the output interface comprises an audio device included in the vehicle, the audio device of the vehicle configured to output the information associated with the event data message as audio output.

7. The system of claim 1, wherein the output interface comprises an audio device of the vehicle, the audio device of the vehicle configured to output the information associated with the event data message the interface output.

8. The system of claim 1, wherein:
the notification component is configured to select an additional output interface of the vehicle or a mobile computing device; and
the direct action application programming interface is further configured to:
generate an additional event data message corresponding to the trigger event, the additional event data message formatted based on the additional output interface, and
transmit the additional event data message to the additional output interface to cause the additional output interface to output information associated with the additional event data message.

9. The system of claim 8, wherein the direct action application programming interface generates the additional event data message as at least one of a text message, an email, and a push notification for the mobile computing device executing a second digital assistant application.

10. The system of claim 1, wherein:
the vehicle diagnostic data comprises a first set of vehicle diagnostic data;
the event determination component is further configured to:
receive a second set of vehicle diagnostic data sensed by at least one of the plurality of sensors of the vehicle, and
identify, based on an analysis of the second set of vehicle diagnostic data, an additional trigger event associated with the vehicle;
the notification component is further configured to:
select an additional output interface based on the additional trigger event; and
the direct action application programming interface is further configured to:
generate an additional event data message corresponding to the additional trigger event, the additional event data message formatted based on the additional output interface, and
transmit the additional event data message to the additional output interface to cause the additional output interface to output information associated with the additional event data message.

11. The system of claim 1, wherein the event determination component is further configured to:
determine a first vehicular state of the vehicle;
monitor the vehicle diagnostic data to determine a state change of the vehicle; and
identify the trigger event based on the state change of the vehicle.

12. The system of claim 1, wherein:
the notification component determines a notification time associated with the event data message; and
the direct action application programming interface transmits the event data message to the output interface to cause the output interface to output information associated with the event data message at the notification time.

13. The system of claim 12, wherein the event determination component determines a priority level associated with the trigger event, and wherein the notification component determines the notification time based in part on the priority level of the trigger event.

14. A vehicle diagnostic method, comprising:
receiving, by a digital assistant application executed by a data processing system installed in a vehicle, via an interface of the data processing system, vehicle diagnostic data sensed by at least one of a plurality of sensors associated with the vehicle;
identifying, by the digital assistant application, based on an analysis of the vehicle diagnostic data, a trigger event associated with the vehicle, wherein identifying the trigger event associated with the vehicle comprises:
analyzing the vehicle diagnostic data to predict a future maintenance activity of the vehicle, and
associating the future maintenance activity with the trigger event associated with the vehicle;
identifying, by the digital assistant application, an output interface of the vehicle based on the trigger event;
generating, by the digital assistant application, an event data message corresponding to the trigger event, the event data message formatted as output compatible with the output interface; and transmitting, by the digital assistant application, the event data message from the digital assistant application to the output interface to cause the output interface to output information associated with the event data message as an interface output.

15. The method of claim 14 further comprising:

determining, by the digital assistant application, a recommended action associated with the trigger event; and generating, by the digital assistant application, the event data message to include information corresponding to the recommended action.

16. The method of claim 15 further comprising:

determining, by the digital assistant application, the recommended action based in part on information stored on a computing device remote from the vehicle.

17. The method of claim 14 further comprising:

receiving, by the digital assistant application, an input audio signal; and parsing, by the digital assistant application, the input audio signal to identify a request and generate an action data message based on the request, the action data message indicating a function.

18. The method of claim 17 further comprising:

executing, by the digital assistant application, the function indicated by the action data message.

19. The method of claim 14, wherein analyzing the vehicle diagnostic data to predict the future maintenance activity of the vehicle comprises:

analyzing the vehicle diagnostic data sensed by the at least one of the plurality of sensors associated with the vehicle to predict that one or more components of the vehicle will fail before the failure occurs.

20. The method of claim 19, wherein analyzing the vehicle diagnostic data sensed by the at least one of the plurality of sensors associated with the vehicle is tailored to how a user of the vehicle has driven the vehicle.

* * * * *